US012664966B2

(12) United States Patent
Chang

(10) Patent No.: US 12,664,966 B2
(45) Date of Patent: Jun. 23, 2026

(54) COOKER HOOD WITH FUNCTION OF ACTIVE NOISE CANCELLATION

(71) Applicant: CHUNG YUAN CHRISTIAN UNIVERSITY, Taoyuan City (TW)

(72) Inventor: Cheng-Yuan Chang, Taoyuan City (TW)

(73) Assignee: CHUNG YUAN CHRISTIAN UNIVERSITY, Taoyuan City (TW)

( * ) Notice: Subject to any disclaimer, the term of this patent is extended or adjusted under 35 U.S.C. 154(b) by 162 days.

(21) Appl. No.: 18/657,953

(22) Filed: May 8, 2024

(65) Prior Publication Data

US 2025/0292758 A1 Sep. 18, 2025

(30) Foreign Application Priority Data

Mar. 13, 2024 (TW) ................................ 113109260

(51) Int. Cl.
*G10K 11/16* (2006.01)
*F24C 15/20* (2006.01)
*G10K 11/178* (2006.01)

(52) U.S. Cl.
CPC ........ *G10K 11/17823* (2018.01); *F24C 15/20* (2013.01); *G10K 11/17825* (2018.01); *G10K 11/17881* (2018.01); *G10K 2210/109* (2013.01); *G10K 2210/112* (2013.01); *G10K 2210/3026* (2013.01); *G10K 2210/3027* (2013.01); *G10K 2210/3046* (2013.01); *G10K 2210/3224* (2013.01)

(58) Field of Classification Search
CPC ....... G10K 11/17823; G10K 11/17825; G10K 11/17881; G10K 2210/109; G10K 2210/112; G10K 2210/3026; G10K 2210/3027; G10K 2210/3046; G10K 2210/3224; F24C 15/20
USPC ................................................ 381/71.5, 71.1
See application file for complete search history.

(56) References Cited

U.S. PATENT DOCUMENTS

2010/0028134 A1* 2/2010 Slapak ............ G10K 11/17853 415/119
2014/0086425 A1* 3/2014 Jensen ............ G10K 11/17825 381/71.11
2016/0372106 A1* 12/2016 Hanazono .............. F24C 15/20

* cited by examiner

*Primary Examiner* — Ammar T Hamid

(57) ABSTRACT

A cooker hood with function of active noise cancellation is disclosed. The cooker hood comprises a hood body, a chimney, a fan motor, a sound-absorbing member, and an ANC system, in which the sound-absorbing member blocks or destroys a sound wave of a noise sound produced in case of the operation of the fan motor. The ANC system comprises reference microphones, error microphones, an electronic device, and loudspeakers, and is utilized for collecting a noise sound in chimney, generating an anti-noise signal according to the noise sound, and driving the loudspeaker to broadcast an anti-noise sound toward an internal of the chimney. Briefly speaking, the sound-absorbing member and the ANC system are used to apply a passive noise cancellation treatment and an active noise cancellation treatment to the noise sound produced during the operation of the fan motor.

11 Claims, 14 Drawing Sheets

COOKER HOOD WITH FUNCTION OF ACTIVE NOISE CANCELLATION

CROSS-REFERENCE TO RELATED APPLICATION

This application claims the priority of Taiwan Patent Application No. 113109260, filed on March 13, 2024, the content of which is incorporated by reference in its entirety.

TECHNICAL FIELD

The present invention relates to the technology field of cooker hoods, and more particularly to a cooker hood with function of active noise cancellation.

BACKGROUND

It is well known that cooker hood is an essential device in a modern kitchen for rapidly discharging a waste gas generated while a fire burns in a stove and a lampblack that is generated during a cooking process and that is harmful to human bodies. FIG. 1 illustrates a stereo diagram of a conventional cooker hood la, which comprises a hood body 11*a,* a chimney 12*a,* a fan motor 13*a* disposed in the chimney 12*a,* and a control device.

User is able to operate a user interface disposed on the hood body 11*a* while cooking, such that the control device is enabled so as to control the fan motor 13*a* to operation, thereby discharging the waste gas and/or the lampblack to outdoors via the chimney 12*a* and an exhaust duct that is connected to the chimney 12*a*. However, user experience feedback particularly indicates that the fan motor 13*a* in operation would generate a noise with a significant magnitude, and such noise leads the people staying in kitchen and the other people staying in a space that is adjacent to the kitchen to not feel well.

For above reasons, to develop a specific active noise control (ANC) system for application in the cooker hood is worthy of consideration, such that the noise generated by the fan motor in operation may be significantly attenuated by the ANC system. Accordingly, inventors of the present application have made great efforts to make inventive research and eventually provided a cooker hood with function of active noise cancellation.

SUMMARY

The primary objective of the present invention is to provide a cooker hood with function of active noise cancellation, comprising: a hood body, a chimney, a fan motor, a sound-absorbing member, and an active noise cancellation (ANC) system. According to the present invention, the sound-absorbing member is adopted for blocking or destroying a sound wave of a noise sound that is produced in case of the operation of the fan motor. Moreover, the ANC system comprises a plurality of reference microphones, a plurality of error microphones, an electronic device, and at least one loudspeaker, and is utilized for collecting a sound from an internal of the chimney, generating an anti-noise signal according to the sound, and driving the loudspeaker to broadcast an anti-noise sound toward the internal of the chimney. Briefly speaking, the sound-absorbing member and the ANC system are used in the present invention to apply a passive noise cancellation treatment and an active noise cancellation treatment to the noise sound produced during the operation of the fan motor.

For achieving the primary objective mentioned above, the present invention provides an embodiment of the cooker hood with function of active noise cancellation, which comprises:

a hood body having a top opening;

a chimney, being connected to the top opening by a first opening thereof;

a fan motor, being disposed in the chimney, and being disposed to be at a first disposing height;

a sound-absorbing member, comprising a first sound-absorbing segment attached onto an inner wall of the chimney and a second sound-absorbing segment attached onto an inner surface of the hood body;

a plurality of first reference microphones, wherein each of the plurality of first reference microphones is disposed to be at a second disposing height and pass through the first sound-absorbing segment by a microphone head thereof, such that the microphone head of each of the plurality of first reference microphones stays in an internal space of the chimney;

a plurality of error microphones, wherein each of the plurality of error microphones is disposed to be at a third disposing height and pass through the first sound-absorbing segment by a microphone head thereof, such that the microphone head of each of the plurality of error microphones stays in the internal space;

at least one loudspeaker, wherein the at least one loudspeaker is disposed to be at a disposing height and pass through the first sound-absorbing segment by a surround ring thereof, thereby making a sound broadcasting portion of the at least one loudspeaker face the internal space; and an electronic device, being coupled to the plurality of first reference microphones, the plurality of error microphones and the at least one loudspeaker;

wherein the first disposing height is higher than the second disposing height, the second disposing height is higher than the third disposing height, and the disposing height is higher than the third disposing height and lower the second disposing height;

wherein is electronic device is configured to:

obtain, by controlling the plurality of first reference microphones to collect a first sound in the internal space, a first analog signal;

obtain, by controlling the plurality of error microphones to collect a second sound in the internal space, a second analog signal;

generate, by applying an analog-to-digital converting process to the first analog signal and the second analog signal, a first digital signal and a second digital signal;

generate, by applying an active noise attenuating process to the first digital signal and the second digital signal, a digital output signal;

generate, by applying a digital-to-analog converting process to the digital output signal, an analog output signal; and broadcast, by driving the at least one loudspeaker, the analog output signal as an anti-noise sound toward the internal space.

In one practicable embodiment, the cooker hood further comprises:

a sound-absorbing block, being vertically disposed in the internal space of the chimney; and a plurality of second reference microphones, being disposed on a top of the sound-absorbing block so as to face the face motor;

wherein each of plurality of second reference microphones is coupled to the electronic device, and is disposed to be at a fourth disposing height;

wherein the fourth disposing height is higher than the second disposing height and lower than the first disposing height.

In one embodiment, the fan motor is disposed to be spaced a first distance apart from the top opening of the hood body, each of the plurality of first reference microphones is disposed to be spaced a second distance apart from the top opening, each of the plurality of error microphones is disposed to be spaced a third distance apart from the top opening, and each of the plurality of second reference microphones is disposed to be spaced a fourth distance apart from the top opening.

In one embodiment, a ratio of the third distance against the second distance is in a range between 3 and 5, and a ratio of the second distance against the fourth distance is in a range between 0.3 and 1.3.

In one embodiment, the at least one loudspeaker is disposed to be spaced a specific distance apart from the top opening of the hood body, and a ratio of the third distance against the specific distance is in a range between 2 and 4.

In one embodiment, the chimney is provided with a plurality of first orifices, a plurality of second orifices and at least one third orifice thereon, such that each of the plurality of first reference microphones passes through one corresponding first orifice, each of the plurality of error microphones passes through one corresponding second orifice, and the surround ring of the loudspeaker passes through the third orifice.

In one embodiment, a first mounting bracket is connected to the inner wall of the chimney, such that the fan motor is disposed in the internal space of the chimney through the mounting bracket.

In one embodiment, the sound-absorbing block is provided with a peripheral flange thereon, the inner wall of the chimney is further disposed with a second mounting bracket, and the second mounting bracket comprises:

a plate having a perforation; and at least two connecting ribs, being connected between a left side of the plate and the inner wall of the chimney, and being also connected between a right side of the plate and the inner wall of the chimney;

wherein the sound-absorbing block passes through the perforation of the plate, such that the peripheral flange is supported by a top surface of the plate.

In one embodiment, the first sound-absorbing segment is provided with a plurality of fourth orifices, a plurality of fifth orifices and at least one sixth orifice thereon, such that each of the plurality of first reference microphones passes through one corresponding fourth orifice, each of the plurality of error microphones passes through one corresponding fifth orifice, and the surround ring of the loudspeaker passes through the sixth orifice.

In one embodiment, the first mounting bracket comprises at least two mounting plates, and the first sound-absorbing segment is further provided with at least two seventh orifices and at least two eighth orifices thereon, such that each of the at least two mounting plates passes through one corresponding seventh orifice, and each of the at least two connecting ribs passes through one corresponding eighth orifice.

In one practicable embodiment, the electronic device comprises:

a first analog-to-digital (A/D) converter coupled to the plurality of first reference microphones;

a second analog-to-digital (A/D) converter coupled to the plurality of error microphones;

a core processor module coupled to the first A/D converter and the second A/D converter; and a digital-to-analog (D/A) converter coupled to the core processor module;

wherein the core processor module comprises a processor and a memory storing an application program, and the processor executes the application program so as to be configured to:

obtain, by controlling the plurality of first reference microphones to collect the first sound in the internal space, the first analog signal;

generate, by enabling the first A/D converter to apply the analog-to-digital converting process to the first analog signal, the first digital signal;

obtain, by controlling the plurality of error microphones to collect the second sound in the internal space, the second analog signal;

generate, by enabling the second A/D converter to apply the analog-to-digital converting process to the second analog signal, the second digital signal;

generate, by applying the active noise attenuating process to the first digital signal and the second digital signal, the digital output signal;

generate, by enabling the D/A converter to apply the digital-to-analog converting process to the digital output signal, the analog output signal; and broadcast, by driving the at least one loudspeaker, the analog output signal as the anti-noise sound toward the internal space.

In another one practicable embodiment, the electronic device comprises:

a first analog-to-digital (A/D) converter coupled to the plurality of first reference microphones;

a second analog-to-digital (A/D) converter coupled to the plurality of error microphones;

a third analog-to-digital (A/D) converter coupled to the plurality of second reference microphones;

a core processor module coupled to the first A/D converter and the second A/D converter; and a digital-to-analog (D/A) converter coupled to the core processor module;

wherein the core processor module comprises a processor and a memory storing an application program, and the processor executes the application program so as to be configured to:

obtain, by controlling the plurality of first reference microphones to collect the first sound in the internal space, the first analog signal;

generate, by enabling the first A/D converter to apply the analog-to-digital converting process to the first analog signal, the first digital signal;

obtain, by controlling the plurality of error microphones to collect the second sound in the internal space, the second analog signal;

generate, by enabling the second A/D converter to apply the analog-to-digital converting process to the second analog signal, the second digital signal;

obtain, by controlling the plurality of second reference microphones to collect a third sound in the internal space, a third analog signal;

generate, by enabling the third A/D converter to apply the analog-to-digital converting process to the third analog signal, a third digital signal;

generate, by applying the active noise attenuating process to the first digital signal, the second digital signal and the third digital signal, the digital output signal;

generate, by enabling the D/A converter to apply the digital-to-analog converting process to the digital output signal, the analog output signal; and broadcast, by driving the at least one loudspeaker, the analog output signal as the anti-noise sound toward the internal space.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a cooker hood with function of active noise cancellation according to the present invention, embodiments of the present invention will be described in detail with reference to the attached drawings hereinafter.

First Embodiment

Figure 1:
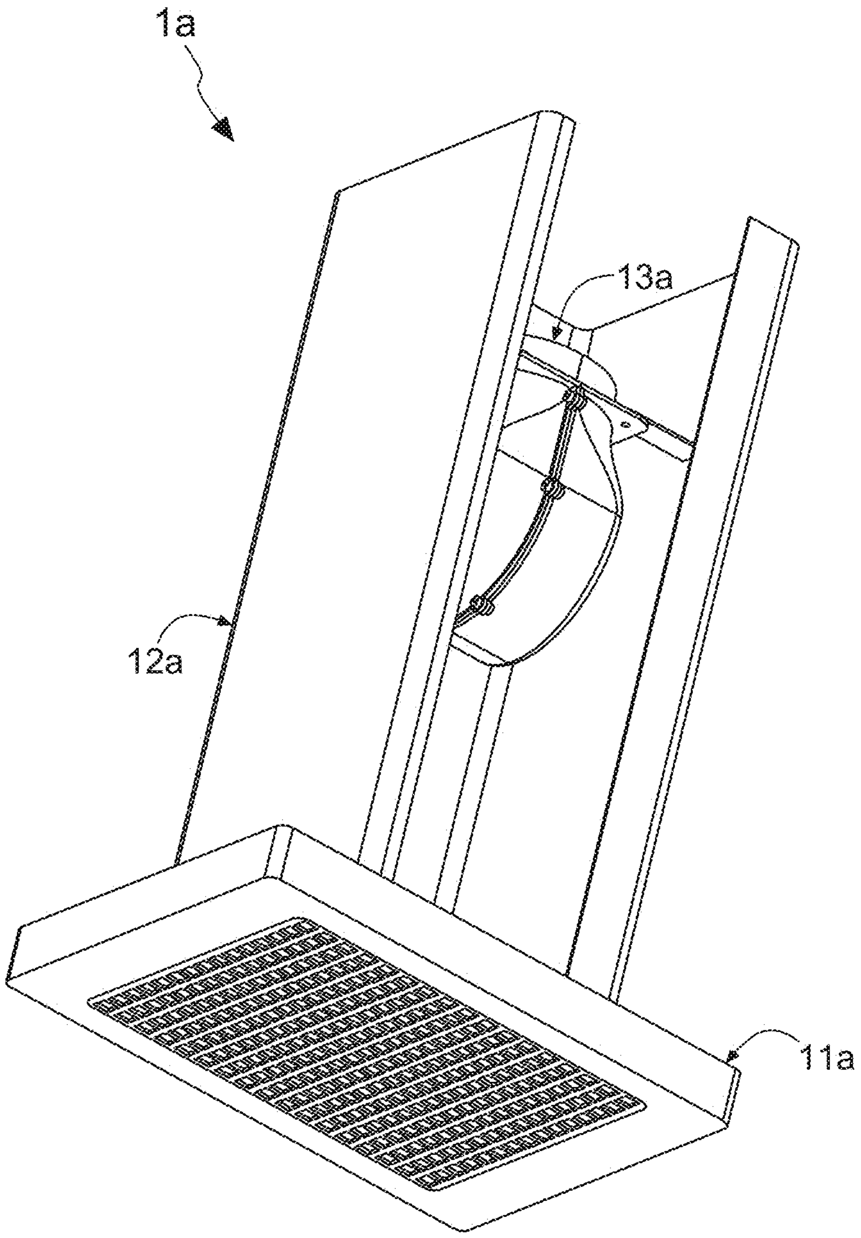
FIG. 1 (Prior art)
FIG. 1 is a stereo diagram of a conventional cooker hood.
Figure 2A:
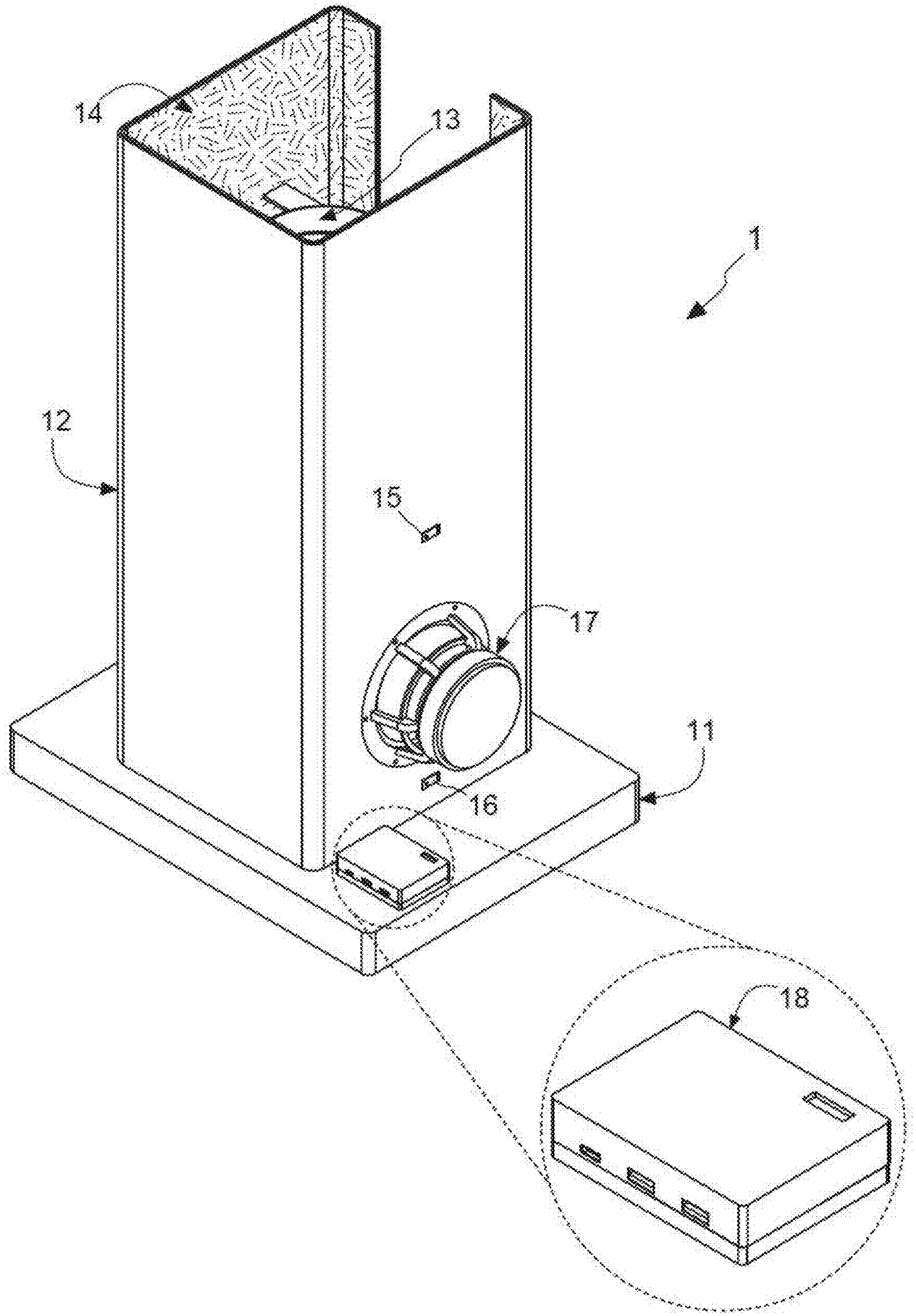
FIG. 2A is a first stereo diagram of a cooker hood with function of active noise cancellation according to the present invention.
Figure 2B:
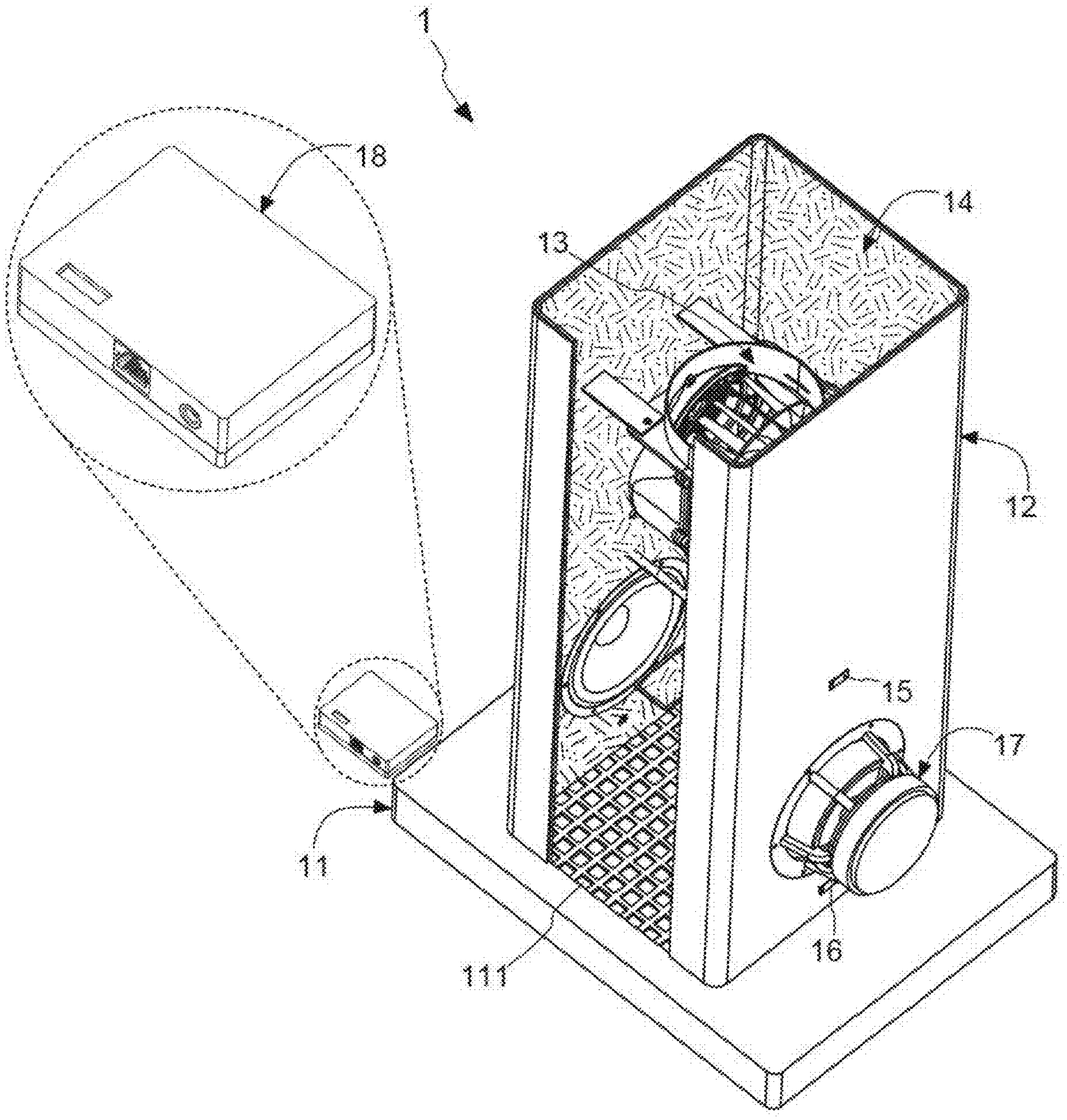
FIG. 2B is a second stereo diagram of the cooker hood with function of active noise cancellation according to the present invention.

With reference to FIG. 2A and FIG. 2B, there are illustrated a first stereo diagram and a second stereo diagram of a cooker hood with function of active noise cancellation according to the present invention. According to FIG. 2A and FIG. 2B, the present invention discloses a cooker hood 1, comprising: a hood body 11, a chimney 12, a fan motor 13, a sound-absorbing member 14, and an active noise cancellation (ANC) system, in which the ANC system comprises a plurality of first reference microphones 15, a plurality of error microphones 16, at least one loudspeaker 17, and an electronic device 18.

Figure 3:
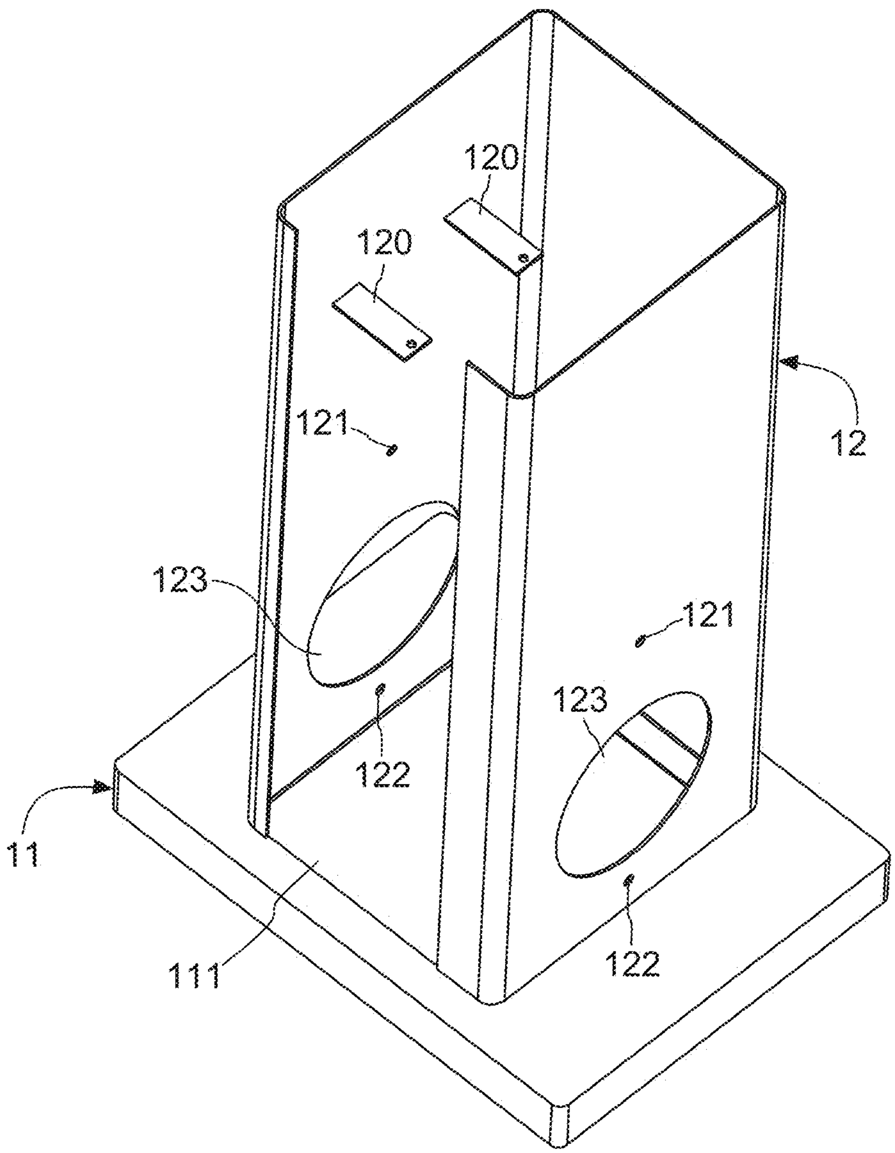
FIG. 3 is a first stereo diagram of a hood body and a chimney.
Figure 4:
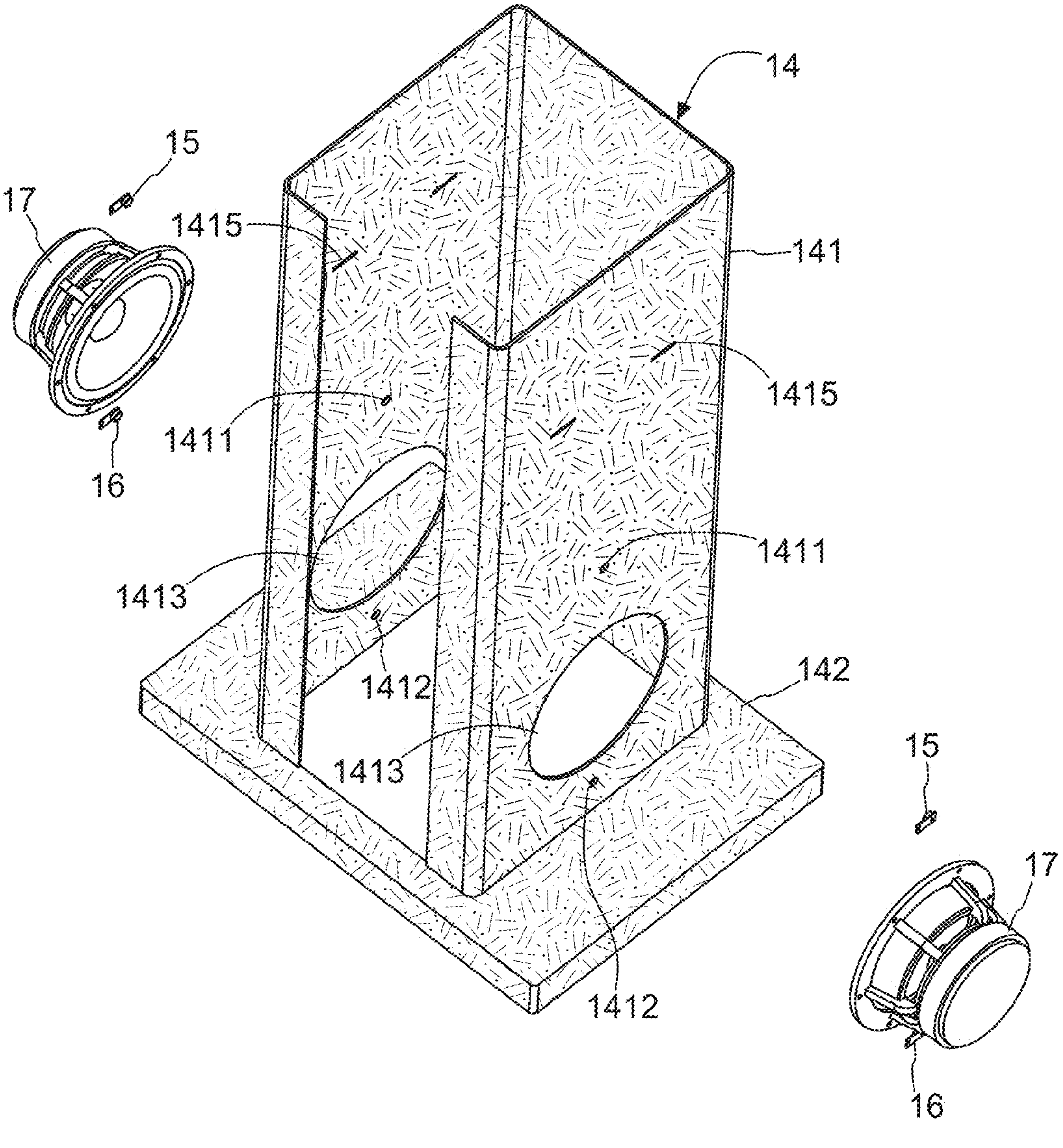
FIG. 4 is a stereo diagram of a sound-absorbing member.
Figure 5:
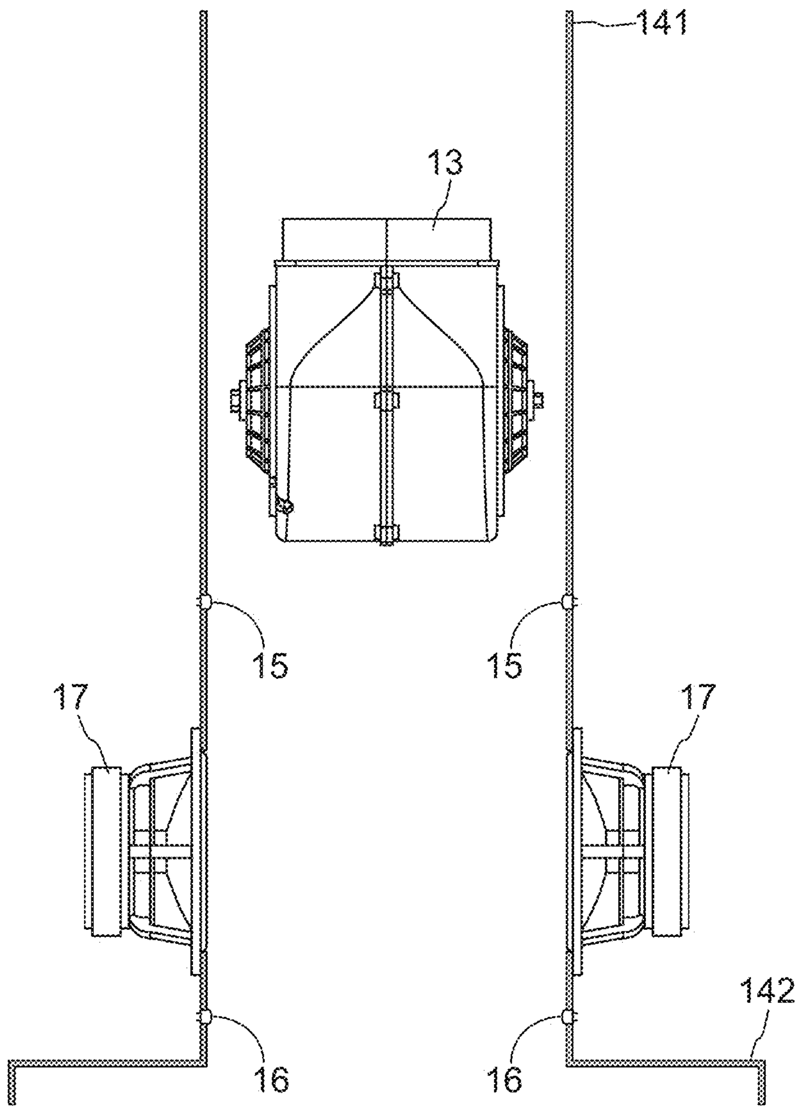
FIG. 5 is a side view of the sound-absorbing member.

FIG. 3 is a first stereo diagram of the hood body 11 and the chimney 12, FIG. 4 is a stereo diagram of the sound-absorbing member 14, and FIG. 5 is a side view of the sound-absorbing member 14. As FIG. 2A, FIG. 2B, FIG. 3, FIG. 4, and FIG. 5 show, the hood body 111 has a top opening 111, the chimney 12 has a first opening (i.e., bottom opening) and a second opening (i.e., top opening), and the chimney 12 is connected to the top opening 111 of the hood body 11 by the first opening thereof. Moreover, the fan motor 13 is disposed in an internal space of the chimney 12, and is disposed to be at a first disposing height. It should be known that a first end of an exhaust duct is inserted into the internal space of the chimney 12 via the second opening, so as to be connected to a discharge port of the fan motor 13. In addition, a second end of the exhaust duct is set to stay outdoors. As described in more detail below, the sound-absorbing member 14 is made of a sound-absorbing foam, and comprises a first sound-absorbing segment 141 attached onto an inner wall of the chimney 12 and a second sound-absorbing segment 142 attached onto an inner surface of the hood body 11.

According to the present invention, each of the plurality of first reference microphones 15 is disposed to be at a second disposing height and pass through the first sound-absorbing segment 141 by a microphone head thereof, such that the microphone head of each of the plurality of first reference microphones 15 stays in an internal space of the chimney 12. In contrast, each of the plurality of error microphones 16 is disposed to be at a third disposing height and pass through the first sound-absorbing segment 141 by a microphone head thereof, such that the microphone head of each of the plurality of error microphones 16 stays in the internal space. On the other hand, the at least one loudspeaker 17 is disposed to be at a disposing height and pass through the first sound-absorbing segment 141 by a surround ring thereof, thereby making a sound broadcasting portion of the at least one loudspeaker 17 face the internal space. It is worth particularly explaining that, the first disposing height is higher than the second disposing height, the second disposing height is higher than the third disposing height, and the disposing height is higher than the third disposing height and lower the second disposing height.

Figure 6:
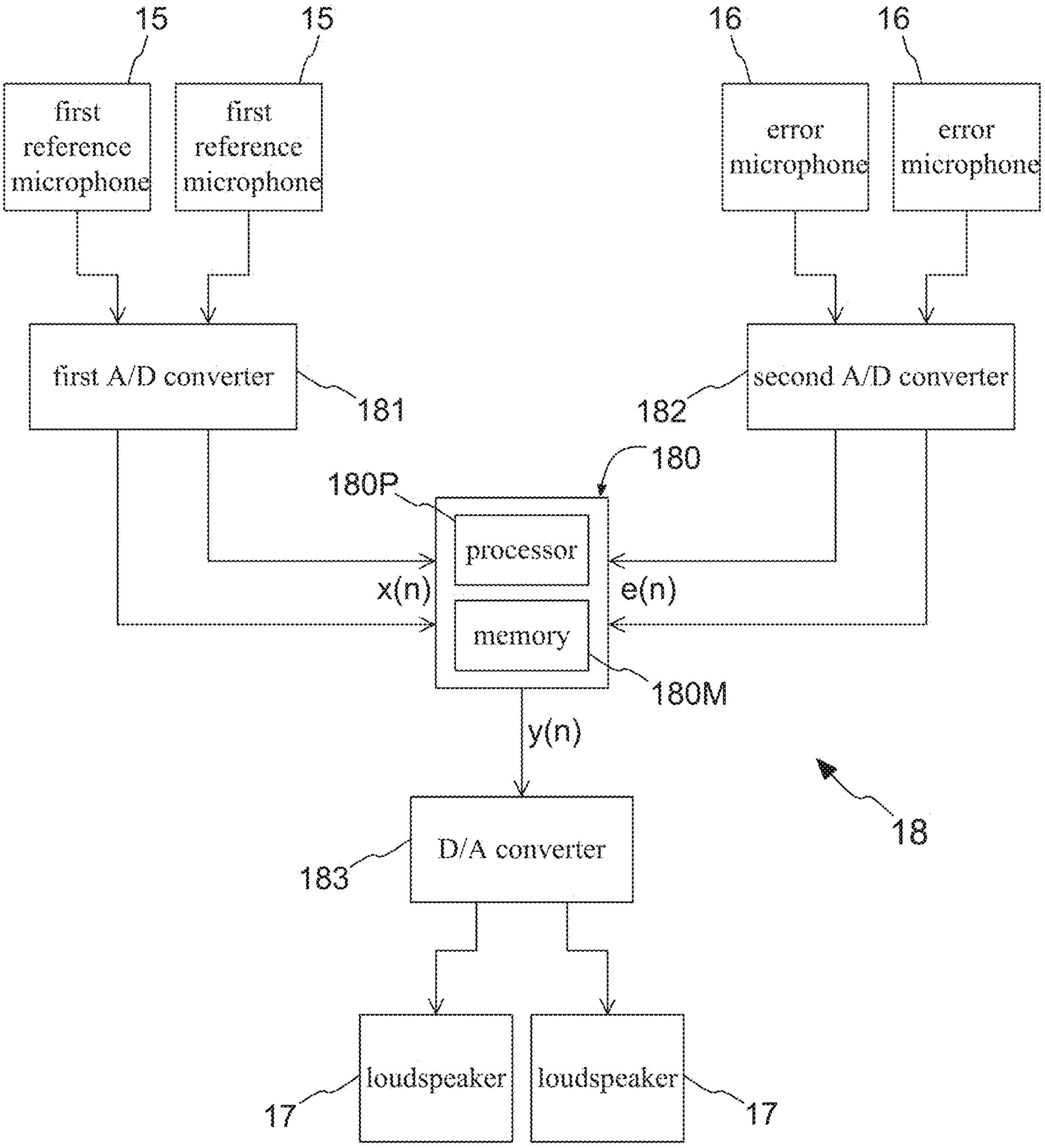
FIG. 6 is a first block diagram of an electronic device.

FIG. 6 is a first block diagram of the electronic device 18, in which the electronic device 18 is coupled to the plurality of first reference microphones 15, the plurality of error microphones 16 and the at least one loudspeaker 17, and comprises: a first analog-to-digital (A/D) converter 181, a second analog-to-digital (A/D) converter 182, a core processor module 180, and a digital-to-analog (D/A) converter 183. As FIG. 2A, FIG. 2B, FIG. 5, and FIG. 6 show, the first A/D converter 181 is coupled to the plurality of first reference microphones 15, the second A/D converter 182 is coupled to the plurality of error microphones 16, the core processor module 180 is coupled to the first A/D converter 181 and the second A/D converter 182, and the D/A converter 183 is coupled to the core processor module 180 and the at least one loudspeaker 17. According to the present invention, the core processor module 180 comprises a processor 180P and a memory 180M storing an application program, and the processor 180M executes the application program so as to be configured to:

control the plurality of first reference microphones 15 to collect a first sound in the internal space of the chimney 12 so as to obtain a first analog signal;

enable the first A/D converter 181 to apply an analog-to-digital converting process to the first analog signal, thereby generating a first digital signal;

control the plurality of error microphones 16 to collect a second sound in the internal space so as to obtain a second analog signal;

enable the second A/D converter 182 to apply the analog-to-digital converting process to the second analog signal, thereby generating a second digital signal;

apply an active noise attenuating process to the first digital signal and the second digital signal, and then generating a digital output signal;

enable the D/A converter 183 to apply a digital-to-analog converting process to the digital output signal, thereby generating an analog output signal; and drive the at least one loudspeaker 17 to broadcast the analog output signal as the anti-noise sound toward the internal space.

As described in more detail below, the sound-absorbing member 14 herein is adopted for blocking or destroying a sound wave of a noise sound that is produced in case of the operation of the fan motor 13. In contrast, the ANC system comprising the first reference microphones 15, the error microphones 16, the electronic device 18, and the loudspeakers 17 is designed to collect the noise sound in the chimney 12, generate an anti-noise signal according to the noise sound, and drive the loudspeakers 17 to broadcast an anti-noise sound toward the internal of the chimney 12. Briefly speaking, the sound-absorbing member 14 and the ANC system are used to apply a passive noise cancellation treatment and an active noise cancellation treatment to the noise sound produced during the operation of the fan motor 13. Moreover, for enhancing the noise reducing (cancelling) effect, the fan motor 13, the first reference microphones 15, the error microphones 16, and the loudspeakers 17 are disposed to be at a first disposing height, a second disposing height, a third disposing height, and a disposing height, respectively. As such, the fan motor 13 is set to be spaced a first distance apart from the top opening 111 of the hood body 11, each of the plurality of first reference microphones 15 is set to be spaced a second distance apart from the top opening 111, and each of the plurality of error microphones 16 is set to be spaced a third distance apart from the top opening 111. In contrast, the at least one loudspeaker 17 is set to be spaced a specific distance apart from the top opening 111 of the hood body 11. Therefore, as FIG. 5 shows, a ratio of the third distance against the second distance is in a range between 3 and 5 (e.g., 4), and a ratio of the third distance against the specific distance is in a range between 2 and 4 (e.g. 3).

Figure 7:
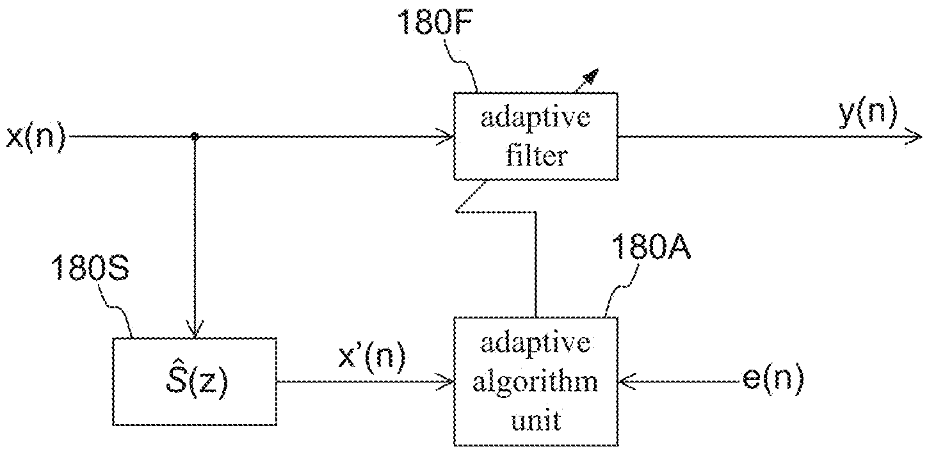
FIG. 7 is a block diagram of an active noise control (ANC) module.

It is worth particularly explaining that an active noise control (ANC) module (i.e., an algorithm) in integrated in the application program, such that the processor 180M, after executing the ANC module, is configured to conduct said active noise attenuating process to the first digital signal and the second digital signal so as to generate a digital output signal. FIG. 7 is a block diagram of the ANC module. As FIG. 7 shows, the ANC module comprises a signal compensator 180S, an adaptive filter 180F and an adaptive algorithm unit 180A. As described in more detail below, the first digital signal is adopted as a first reference signal x(n) so as to be inputted into the signal compensator 180S and the adaptive filter 180F. In real cases the ANC system certainly includes at least one electronic delay, and the signal compensator 180S herein is particularly designed to apply an electronic delay compensating process to the first reference signal x(n). In practicable embodiments, the signal compensator 180S can be, but is not limited to a FIR filter or an IIR filter, in which FIR is an abbreviation of "finite impulse response", and IIR is an abbreviation of "infinite impulse response".

It should be understood that the adaptive filter 180F is used for applying a filtering process to the first reference signal x(n) so as to generate said digital output signal y(n). It is noted that the second digital signal is adopted as an error signal e(n) so as to be inputted into the adaptive algorithm unit 180A, and a second reference signal x'(n) outputted by the signal compensator 180S is also inputted into the adaptive algorithm unit 180A. In practical cases the adaptive algorithm unit 180A is configured to include a mathematic algorithm such as LMS algorithm or NLMS algorithm. It should be known that, LMS is an abbreviation of "least mean square", and NLMS is an abbreviation of "normalized least mean square". Therefore, the adaptive algorithm unit 180A is executed while the active noise attenuating process is conducted, such that the adaptive algorithm unit 180A modulates the at least one filter parameter of the adaptive filter 180F according to the second reference signal x'(n) and the error signal e(n), thereby making the error signal e(n) approach zero. In case of the error signal e(n) is modulated to be approached zero, the anti-noise sound converted from the digital output signal y(n) directly proportional to the amplitude of the noise sound produced during the operation of the fan motor 13, thereby creating a destructive interference to the noise sound. As a result, the destructive interference effectively reduces the volume of the noise sound.

Furthermore, as FIG. 3 and FIG. 4 show, the chimney 12 is provided with a plurality of first orifices 121, a plurality of second orifices 122 and at least one third orifice 123 thereon, such that each of the plurality of first reference microphones 15 passes through one corresponding first orifice 121, each of the plurality of error microphones 16 passes through one corresponding second orifice 122, and the surround ring of the loudspeaker 17 passes through the third orifice 123. In contrast, the first sound-absorbing segment 141 is provided with a plurality of fourth orifices 1411, a plurality of fifth orifices 1412 and at least one sixth orifice 1413 thereon, such that each of the plurality of first reference microphones 15 passes through one corresponding fourth orifice 1411, each of the plurality of error microphones 16 passes through one corresponding fifth orifice 1412, and the surround ring of the loudspeaker 17 passes through the sixth orifice 1413. On the other hand, a first mounting bracket consisting of at least two mounting plates 120 is connected to the inner wall of the chimney 12, such that the fan motor 13 is disposed in the internal space of the chimney 12 through the at least two mounting plates 120. In addition, the first sound-absorbing segment 141 is further provided with at least two seventh orifices 1415, such that each of the at least two mounting plates 120 passes through one corresponding seventh orifice 1415.

Second Embodiment

Figure 8:
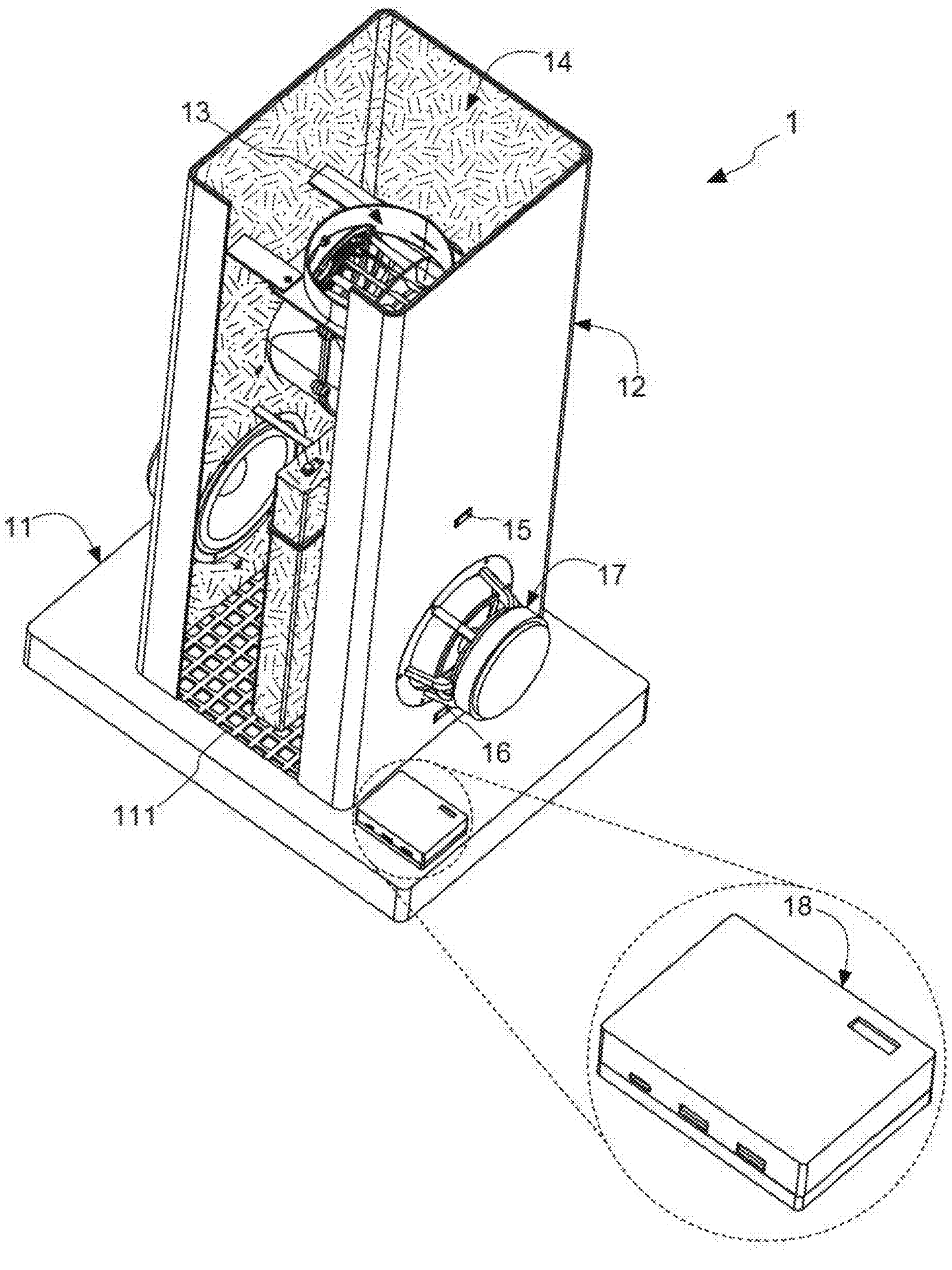
FIG. 8 is a third stereo diagram of the cooker hood with function of active noise cancellation according to the present invention.

With reference to FIG. 8, there is a third stereo diagram of the cooker hood 1 with function of active noise cancellation according to the present invention. As FIG. 8 shows, in second embodiment the cooker hood 1 comprises a hood body 11, a chimney 12, a fan motor 13, a sound-absorbing member 14, a sound-absorbing block 19, and an active noise cancellation (ANC) system, wherein the ANC system comprises a plurality of first reference microphones 15, a plurality of second reference microphones 10, a plurality of error microphones 16, at least one loudspeaker 17, and an electronic device 18.

Figure 9:
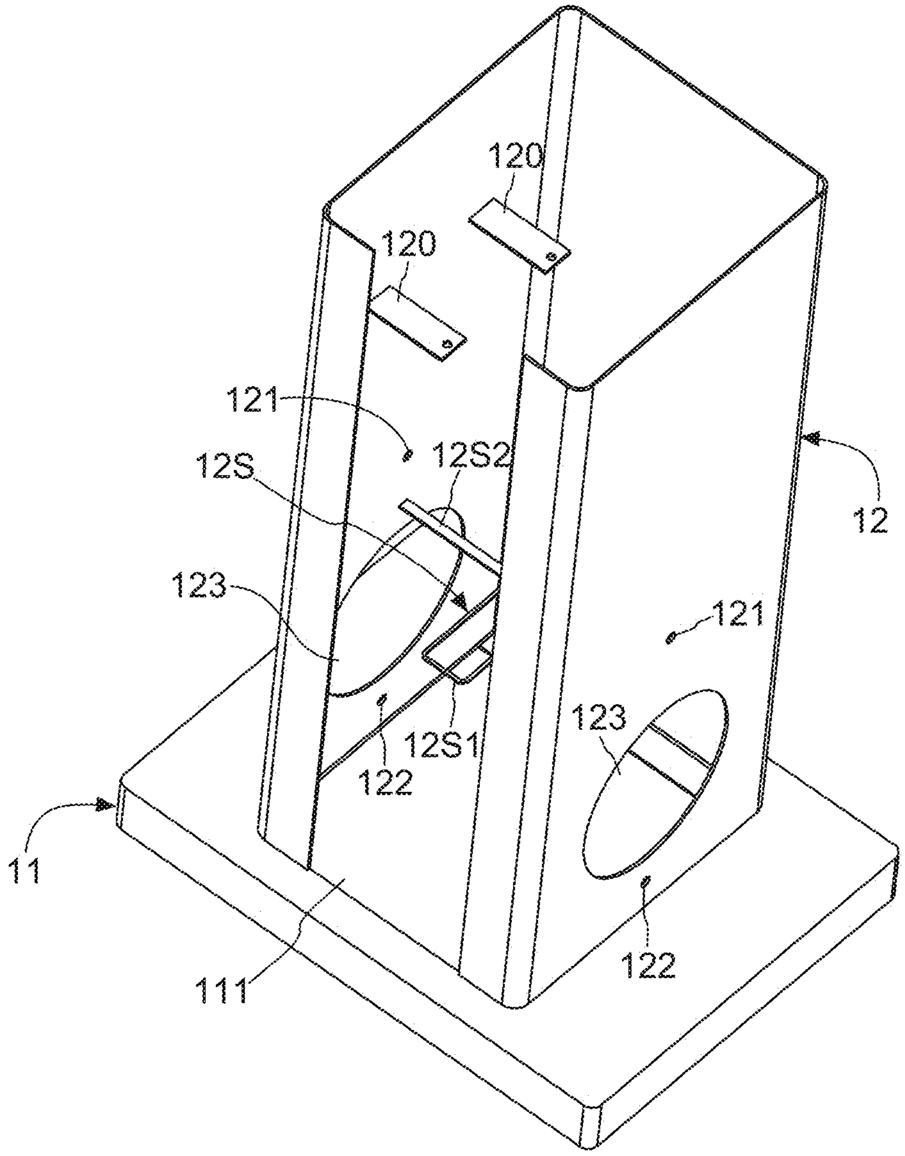
FIG. 9 is a second stereo diagram of the hood body and the chimney.
Figure 10:
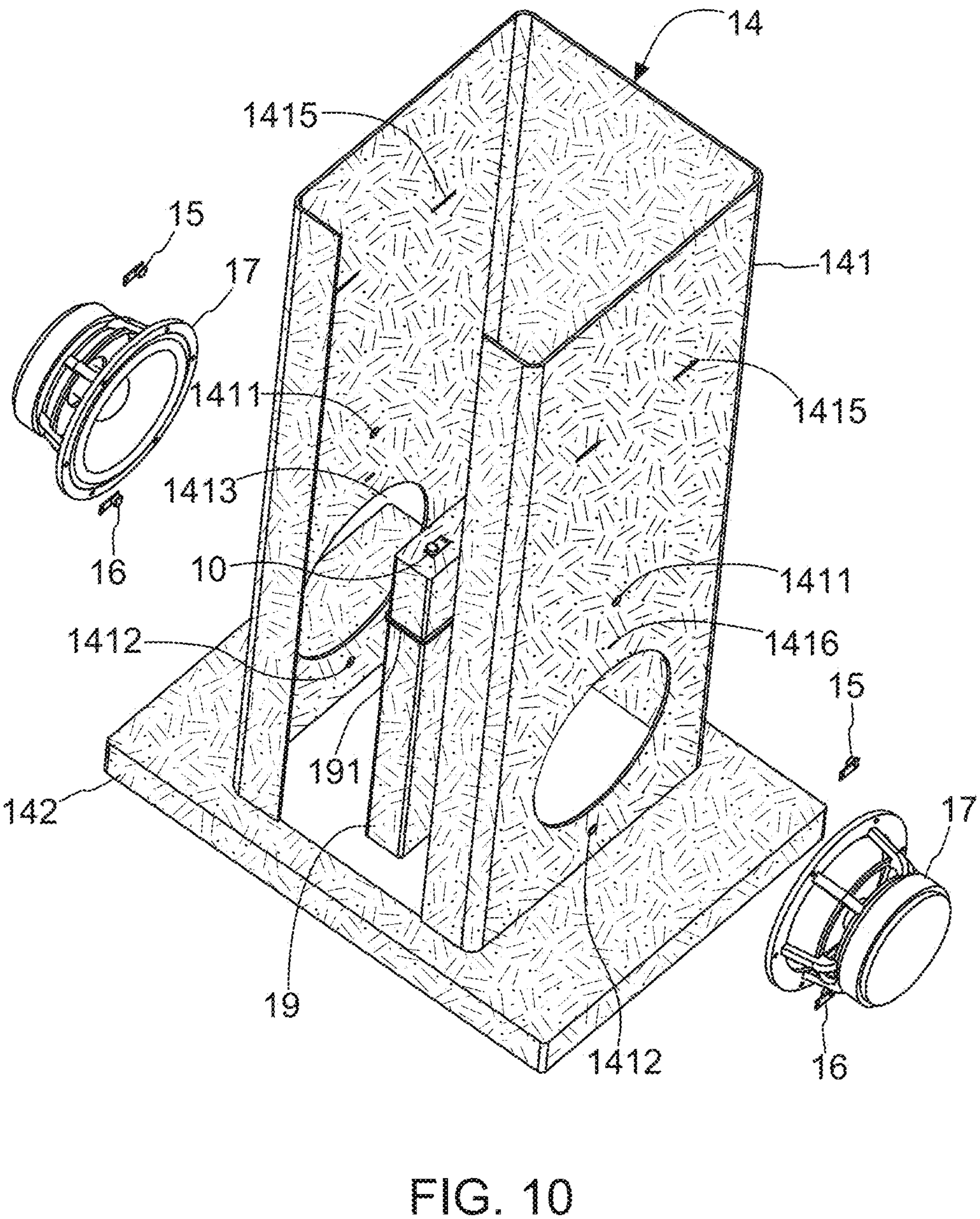
FIG. 10 is a stereo diagram of a sound-absorbing block and the sound-absorbing member.
Figure 11:
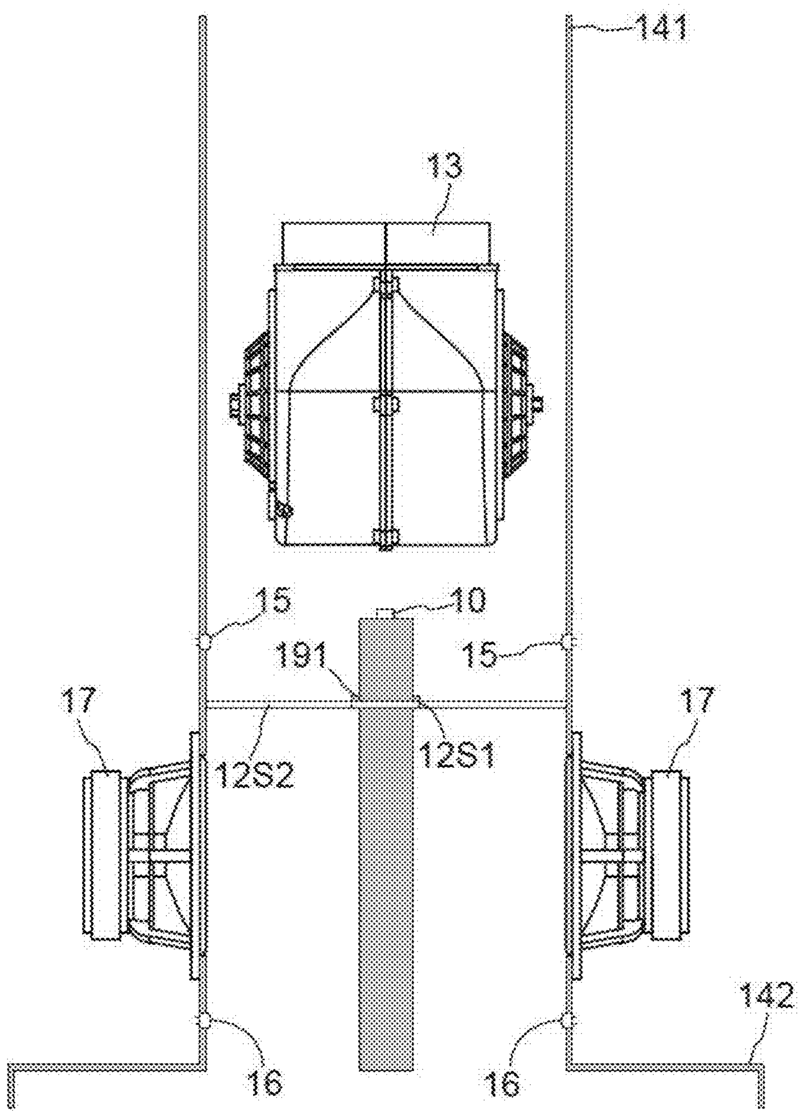
FIG. 11 is a side view of the sound-absorbing block and the sound-absorbing member.

FIG. 9 is a second stereo diagram of the hood body 11 and the chimney 12, FIG. 10 shows a stereo diagram of the sound-absorbing block 19 and the sound-absorbing member 14, and FIG. 11 depicts a side view of the sound-absorbing block 19 and the sound-absorbing member 14. According to FIG. 8, FIG. 9, FIG. 10, and FIG. 11, the hood body 111 has a top opening 111, the chimney 12 has a first opening (i.e., bottom opening) and a second opening (i.e., top opening), and the chimney 12 is connected to the top opening 111 of the hood body 11 by the first opening thereof. Moreover, the fan motor 13 is disposed in an internal space of the chimney 12, and is disposed to be at a first disposing height. As described in more detail below, the sound-absorbing member 14 and the sound-absorbing block 19 are both made of a sound-absorbing foam, and the sound-absorbing member 14 is processed to comprise a first sound-absorbing segment 141 attached onto an inner wall of the chimney 12 and a second sound-absorbing segment 142 attached onto an inner surface of the hood body 11.

According to the present invention, each of the plurality of first reference microphones 15 is disposed to be at a second disposing height and pass through the first sound-absorbing segment 141 by a microphone head thereof, such that the microphone head of each of the plurality of first reference microphones 15 stays in an internal space of the chimney 12. In contrast, each of the plurality of error microphones 16 is disposed to be at a third disposing height and pass through the first sound-absorbing segment 141 by a microphone head thereof, such that the microphone head of each of the plurality of error microphones 16 stays in the internal space. On the other hand, the sound-absorbing block 19 is vertically disposed in the internal space of the chimney 12, and the plurality of second reference microphones 10 are disposed on a top of the sound-absorbing block 19 so as to face the face motor 13, such that each of plurality of second reference microphones 10 is coupled to the electronic device 18, and is disposed to be at a fourth disposing height.

Moreover, at least one loudspeaker 17 is disposed to be at a disposing height and pass through the first sound-absorbing segment 141 by a surround ring thereof, thereby making a sound broadcasting portion of the at least one loudspeaker 17 face the internal space. By such arrangements, the first disposing height is higher than the second disposing height, the second disposing height is higher than the third disposing height, the disposing height is higher than the third disposing height and lower the second disposing height, and the fourth disposing height is higher than the second disposing height and lower than the first disposing height.

Figure 12:
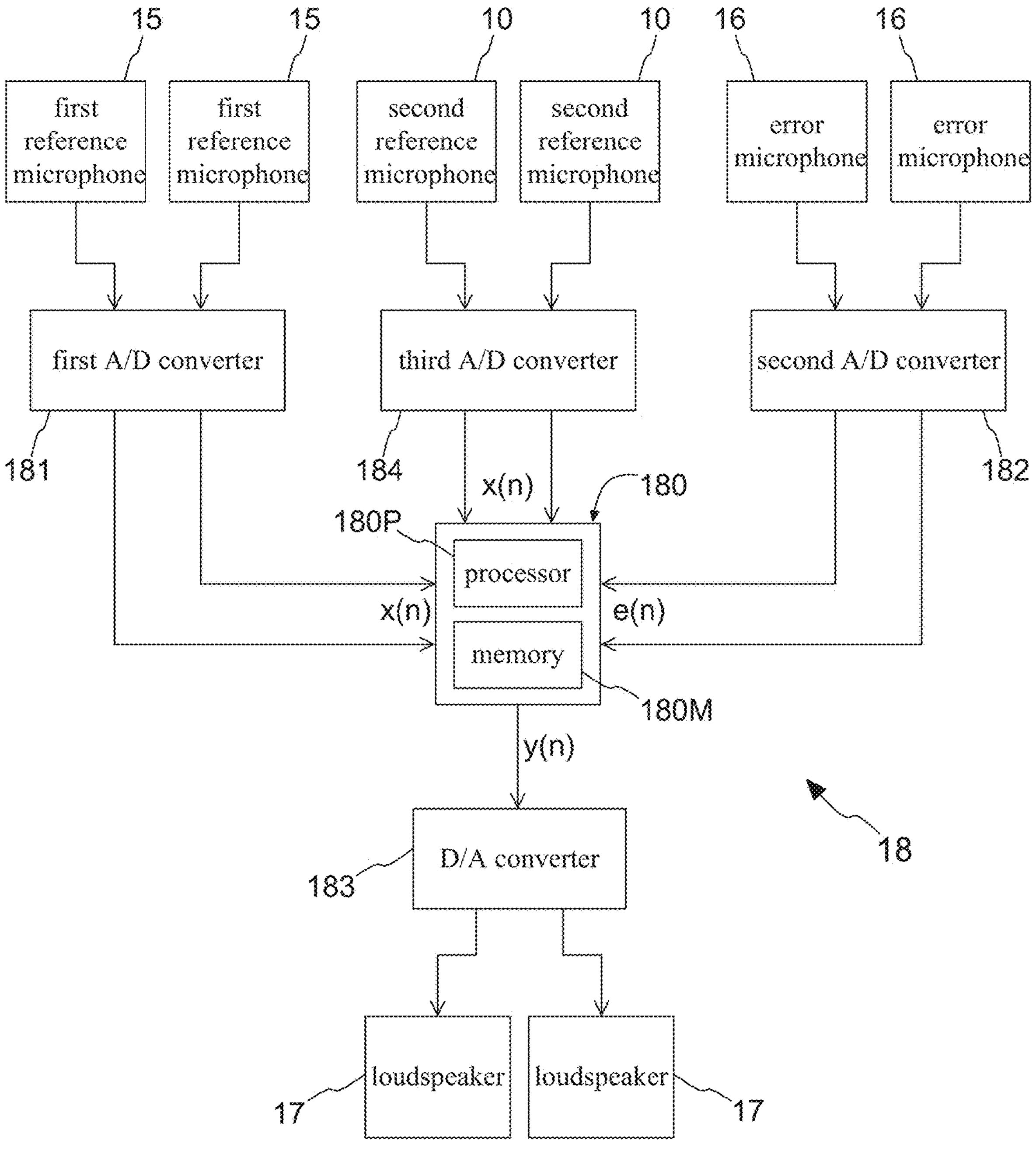
FIG. 12 is a second block diagram of the electronic device.

Furthermore, FIG. 12 is a second block diagram of the electronic device 18. As FIG. 8, FIG. 10, FIG. 11, and FIG. 12 show, the electronic device 18 is coupled to the plurality of first reference microphones 15, the plurality of second reference microphones 10, the plurality of error microphones 16 and the at least one loudspeaker 17, and comprises: a first A/D converter 181, a second A/D converter 182, a third A/D converter 184, a core processor module 180, and a D/A converter 183, in which, the first A/D converter 181 is coupled to the plurality of first reference microphones 15, the second A/D converter 182 is coupled to the plurality of error microphones 16, the third A/D converter 184 is coupled to the plurality of second reference microphones 10, the core processor module 180 is coupled to the first A/D converter 181, the second A/D converter 182 and the third A/D converter 184, and the D/A converter 183 is coupled to the core processor module 180 and the at least one loudspeaker 17.

According to the present invention, the core processor module 180 comprises a processor 180P and a memory 180M storing an application program, and the processor 180M executes the application program so as to be configured to:

- control the plurality of first reference microphones 15 to collect a first sound in the internal space of the chimney 12 so as to obtain a first analog signal;
- enable the first A/D converter 181 to apply an analog-to-digital converting process to the first analog signal, thereby generating a first digital signal;
- control the plurality of error microphones 16 to collect a second sound in the internal space so as to obtain a second analog signal;
- enable the second A/D converter 182 to apply the analog-to-digital converting process to the second analog signal, thereby generating a second digital signal;
- control the plurality of second reference microphones 10 to collect a third sound in the internal space so as to obtain a third analog signal;
- enable the third A/D converter 184 to apply the analog-to-digital converting process to the third analog signal, thereby generating a third digital signal;
- applying the active noise attenuating process to the first digital signal, the second digital signal and the third digital signal so as to generate a digital output signal;
- enable the D/A converter 183 to convert the digital output signal to an analog output signal; and
- drive the at least one loudspeaker 17 to broadcast the analog output signal as the anti-noise sound toward the internal space of the chimney 12.

As described in more detail below, the sound-absorbing member 14 herein is adopted for blocking or destroying a sound wave of a noise sound that is produced in case of the operation of the fan motor 13. In contrast, the ANC system comprising the first reference microphones 15, the second reference microphones 10, the error microphones 16, the electronic device 18, and the loudspeakers 17 is designed to collect the noise sound in the chimney 12, generate an anti-noise signal according to the noise sound, and drive the loudspeakers 17 to broadcast an anti-noise sound toward the internal of the chimney 12. Briefly speaking, the sound-absorbing member 14 and the ANC system are used to apply a passive noise cancellation treatment and an active noise cancellation treatment to the noise sound produced during the operation of the fan motor 13. Moreover, for enhancing the noise reducing (cancelling) effect, the fan motor 13, the first reference microphones 15, the error microphones 16, the second reference microphones 10, and the loudspeakers 17 are disposed to be at a first disposing height, a second disposing height, a third disposing height, a fourth disposing height, and a disposing height, respectively. As such, the fan motor 13 is set to be spaced a first distance apart from the top opening 111 of the hood body 11, each of the plurality of first reference microphones 15 is set to be spaced a second distance apart from the top opening 111, each of the plurality of error microphones 16 is set to be spaced a third distance apart from the top opening 111, and each of the plurality of second reference microphones 10 is disposed to be spaced a fourth distance apart from the top opening 111. In contrast, the at least one loudspeaker 17 is set to be spaced a specific distance apart from the top opening 111 of the hood body 11. Therefore, as FIG. 11 shows, a ratio of the third distance against the second distance is in a range between 3 and 5 (e.g., 4), a ratio of the third distance against the specific distance is in a range between 2 and 4 (e.g. 3), and a ratio of the second distance against the fourth distance is in a range between 0.3 and 1.3.

Figure 13:
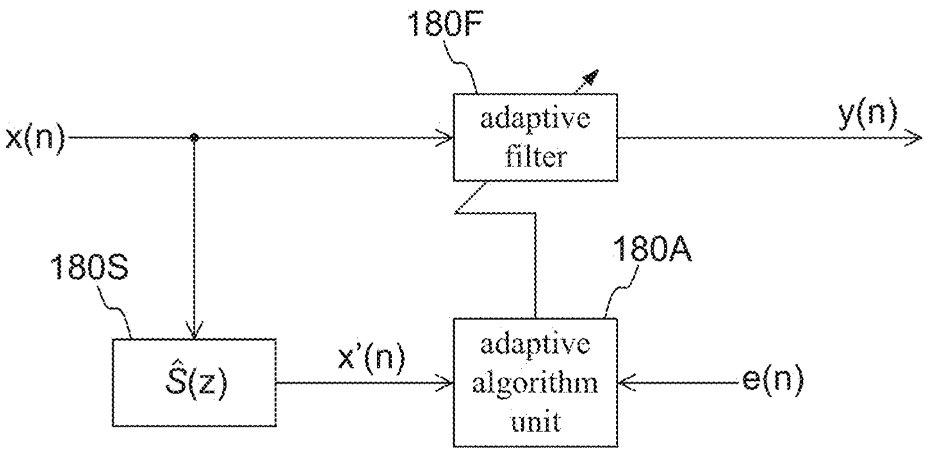
FIG. 13 is a block diagram of an active noise control (ANC) module.

It is worth particularly explaining that an active noise control (ANC) module (i.e., an algorithm) in integrated in the application program, such that the processor 180M, after executing the ANC module, is configured to conduct said active noise attenuating process to the first digital signal and the second digital signal so as to generate a digital output signal. FIG. 13 is a block diagram of an active noise control (ANC) module. As FIG. 13 shows, the ANC module comprises a signal compensator 180S, an adaptive filter 180F and an adaptive algorithm unit 180A. As described in more detail below, the first digital signal and the third digital signal are adopted as a first reference signal x(n) so as to be inputted into the signal compensator 180S and the adaptive filter 180F. In real cases the ANC system certainly includes at least one electronic delay, and the signal compensator 180S herein is particularly designed to apply an electronic delay compensating process to the first reference signal x(n). In practicable embodiments, the signal compensator 180S can be, but is not limited to a FIR filter or an IIR filter, in which FIR is an abbreviation of "finite impulse response", and IIR is an abbreviation of "infinite impulse response".

It should be understood that the adaptive filter 180F is used for applying a filtering process to the first reference signal x(n) so as to generate said digital output signal y(n). It is noted that the second digital signal is adopted as an error signal e(n) so as to be inputted into the adaptive algorithm unit 180A, and a second reference signal x'(n) outputted by the signal compensator 180S is also inputted into the adaptive algorithm unit 180A. In practical cases the adaptive algorithm unit 180A is configured to include a mathematic algorithm such as LMS algorithm or NLMS algorithm. It should be known that, LMS is an abbreviation of "least mean square", and NLMS is an abbreviation of "normalized least mean square". Therefore, the adaptive algorithm unit 180A is executed while the active noise attenuating process is conducted, such that the adaptive algorithm unit 180A modulates the at least one filter parameter of the adaptive filter 180F according to the second reference signal x'(n) and the error signal e(n), thereby making the error signal e(n) approach zero. In case of the error signal e(n) is modulated to be approached zero, the anti-noise sound converted from the digital output signal y(n) directly proportional to the amplitude of the noise sound produced during the operation of the fan motor 13, thereby creating a destructive interference to the noise sound. As a result, the destructive interference effectively reduces the volume of the noise sound.

Furthermore, as FIG. 9 and FIG. 10 show, the chimney 12 is provided with a plurality of first orifices 121, a plurality of second orifices 122 and at least one third orifice 123 thereon, such that each of the plurality of first reference microphones 15 passes through one corresponding first orifice 121, each of the plurality of error microphones 16 passes through one corresponding second orifice 122, and the surround ring of the loudspeaker 17 passes through the third orifice 123. In contrast, the first sound-absorbing segment 141 is provided with a plurality of fourth orifices 1411, a plurality of fifth orifices 1412 and at least one sixth orifice 1413 thereon, such that each of the plurality of first reference microphones 15 passes through one corresponding fourth orifice 1411, each of the plurality of error microphones 16 passes through one corresponding fifth orifice 1412, and the surround ring of the loudspeaker 17 passes through the sixth orifice 1413. On the other hand, a first mounting bracket consisting of at least two mounting plates 120 is connected to the inner wall of the chimney 12, such that the fan motor 13 is disposed in the internal space of the chimney 12 through the at least two mounting plates 120. In addition, the first sound-absorbing segment 141 is further provided with at least two seventh orifices 1415, such that each of the at least two mounting plates 120 passes through one corresponding seventh orifice 1415.

In second embodiment, the sound-absorbing block 19 is provided with a peripheral flange 191 thereon, the inner wall of the chimney 12 is further disposed with a second mounting bracket 12S, wherein the second mounting bracket 12S comprises a plate 12S1 having a perforation and at least two connecting ribs 12S2. As described in more detail below, the at least two connecting ribs 12S2 are connected between a left side of the plate 12S1 and the inner wall of the chimney 12, and being also connected between a right side of the plate 12S1 and the inner wall of the chimney 12. Moreover, the sound-absorbing block 19 passes through the perforation of the plate 12S1, such that the peripheral flange 191 is supported by a top surface of the plate 12S1. Besides, the first sound-absorbing segment 141 is further provided with at least two eighth orifices 1416 thereon, such that each of the at least two connecting ribs 12S2 passes through one corresponding eighth orifice 1416.

Therefore, through above descriptions, all embodiments and their constituting elements of the cooker hood with function of active noise cancellation according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A cooker hood with function of active noise cancellation, comprising:

a hood body having a top opening;

a chimney connected to the top opening by a first opening thereof;

a fan motor, being disposed in the chimney, and being disposed to be at a first disposing height;

a sound-absorbing member, comprising a first sound-absorbing segment attached onto an inner wall of the chimney and a second sound-absorbing segment attached onto an inner surface of the hood body;

a plurality of first reference microphones, wherein each of the plurality of first reference microphones is disposed to be at a second disposing height and pass through the first sound-absorbing segment by a microphone head thereof, such that the microphone head of each of the plurality of first reference microphones stays in an internal space of the chimney;

a plurality of error microphones, wherein each of the plurality of error microphones is disposed to be at a third disposing height and pass through the first sound-absorbing segment by a microphone head thereof, such that the microphone head of each of the plurality of error microphones stays in the internal space;

at least one loudspeaker, wherein the at least one loudspeaker is disposed to be at a disposing height and pass through the first sound-absorbing segment by a surround ring thereof, thereby making a sound broadcasting portion of the at least one loudspeaker face the internal space; and an electronic device, being coupled to the plurality of first reference microphones, the plurality of error microphones and the at least one loudspeaker;

wherein the first disposing height is higher than the second disposing height, the second disposing height is higher than the third disposing height, and the disposing height is higher than the third disposing height and lower the second disposing height;

wherein the electronic device comprises:

a first analog-to-digital converter coupled to the plurality of first reference microphones;

a second analog-to-digital converter coupled to the plurality of error microphones;

a core processor module coupled to the first analog-to-digital converter and the second analog-to-digital converter; and a digital-to-analog converter coupled to the core processor module and the at least one loudspeaker;

wherein the core processor module comprises a processor and a memory storing an application program, and the processor executes the application program so as to:

obtain, by controlling the plurality of first reference microphones to collect a first sound in the internal space and enabling the first A/D converter to apply an analog-to-digital converting process to the first sound, a first analog signal;

obtain, by controlling the plurality of error microphones to collect a second sound in the internal space and enabling the second analog-to-digital converter to apply an analog-to-digital converting process to the second sound, a second analog signal;

generate, by applying an active noise attenuating process to the first digital signal and the second digital signal, a digital output signal; and generate, by enabling the digital-to-analog converter to apply a digital-to-analog converting process to the digital output signal and driving the at least one loudspeaker, an analog output signal corresponding to the digital output signal to broadcast an anti-noise sound toward the internal space.

2. The cooker hood of claim 1, further comprising:

a sound-absorbing block, being vertically disposed in the internal space of the chimney; and a plurality of second reference microphones, being disposed on a top of the sound-absorbing block so as to face the face motor;

wherein each of plurality of second reference microphones is coupled to the electronic device, and is disposed to be at a fourth disposing height;

wherein the fourth disposing height is higher than the second disposing height and lower than the first disposing height.

3. The cooker hood of claim 2, wherein the fan motor is disposed to be spaced a first distance apart from the top opening of the hood body, each of the plurality of first reference microphones is disposed to be spaced a second distance apart from the top opening, each of the plurality of error microphones is disposed to be spaced a third distance apart from the top opening, and each of the plurality of second reference microphones is disposed to be spaced a fourth distance apart from the top opening.

4. The cooker hood of claim 3, wherein a ratio of the third distance against the second distance is in a range between 3 and 5, and a ratio of the second distance against the fourth distance is in a range between 0.3 and 1.3.

5. The cooker hood of claim 3, wherein the at least one loudspeaker is disposed to be spaced a specific distance apart from the top opening of the hood body, and a ratio of the third distance against the specific distance is in a range between 2 and 4.

6. The cooker hood of claim 2, wherein the chimney is provided with a plurality of first orifices, a plurality of second orifices and at least one third orifice thereon, such that each of the plurality of first reference microphones passes through one corresponding first orifice, each of the plurality of error microphones passes through one corresponding second orifice, and the surround ring of the loudspeaker passes through the third orifice.

7. The cooker hood of claim 6, wherein a first mounting bracket is connected to the inner wall of the chimney, such that the fan motor is disposed in the internal space of the chimney through the first mounting bracket.

8. The cooker hood of claim 7, wherein the sound-absorbing block is provided with a peripheral flange thereon, the inner wall of the chimney is further disposed with a second mounting bracket, and the second mounting bracket comprises:

a plate having a perforation; and at least two connecting ribs, being connected between a left side of the plate and the inner wall of the chimney, and being also connected between a right side of the plate and the inner wall of the chimney;

wherein the sound-absorbing block passes through the perforation of the plate, such that the peripheral flange is supported by a top surface of the plate.

9. The cooker hood of claim 8, wherein the first sound-absorbing segment is provided with a plurality of fourth orifices, a plurality of fifth orifices and at least one sixth orifice thereon, such that each of the plurality of first reference microphones passes through one corresponding fourth orifice, each of the plurality of error microphones passes through one corresponding fifth orifice, and the surround ring of the loudspeaker passes through the sixth orifice.

10. The cooker hood of claim 9, wherein the first mounting bracket comprises at least two mounting plates, and the first sound-absorbing segment is further provided with at least two seventh orifices and at least two eighth orifices thereon, such that each of the at least two mounting plates passes through one corresponding seventh orifice, and each of the at least two connecting ribs passes through one corresponding eighth orifice.

11. The cooker hood of claim 2, wherein the electronic device comprises:

a third analog-to-digital converter coupled to the plurality of second reference microphones and the core processor module;

wherein the core processor module is further configured to obtain a third digital signal from the plurality of second reference microphones and to apply the active noise attenuating process based on the first digital signal, the second digital signal, and the third digital signal.

* * * * *